UNITED STATES PATENT OFFICE.

MAX HENRY ISLER, OF MANNHEIM, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE ALDEHYDE AND PROCESS OF MAKING SAME.

No. 828,741.    Specification of Letters Patent.    Patented Aug. 14, 1906.

Application filed February 16, 1906. Serial No. 301,452.

*To all whom it may concern:*

Be it known that I, MAX HENRY ISLER, chemist, a citizen of the Swiss Republic, residing at Mannheim, in the Grand Duchy of Baden, German Empire, have invented new and useful Improvements in Anthraquinone Aldehydes, of which the following is a specification.

My invention relates to the production of a new class of chemical compounds—namely, the aldehydes of the anthraquinone group.

In the specification of application for Letters Patent, Serial No. 301,451, filed February 16, 1906, is described the production of omega-halogen derivatives of 2-methyl-anthraquinone compounds by acting on these latter compounds with a halogenizing agent. I have now discovered that the omega-dihalogen derivatives of 2-methyl-anthraquinone compounds can by treatment with concentrated sulfuric acid, with or without the addition of boric acid, be converted into aldehydes of the anthraquinone group.

My new aldehydes are crystalline compounds, which are soluble in concentrated sulfuric acid, yielding from yellow to yellowish-red solutions, and in anilin yielding reddish-yellow solutions. They are also soluble in alcohol and in glacial acetic acid. On oxidation they can be converted into anthraquinone carboxylic acids.

The aldehyde which I wish to be understood as claiming specifically is 2-anthraquinone aldehyde. This possesses the aforesaid generic properties and in particular gives a yellow solution in concentrated sulfuric acid and is insoluble in caustic-soda solution and on suitable oxidation yields the 2-anthraquinone carboxylic acid.

The following examples will serve to further illustrate the nature of my invention and how it can be carried into practical effect; but my invention is not confined to these examples. The parts are by weight.

Example 1: Heat together one (1) part of omega-dichlor-2-methyl-anthraquinone and ten (10) parts of ninety-seven (97) per cent. sulfuric acid at a temperature of one hundred and thirty (130) degrees centigrade for from five (5) to six (6) hours or until a test portion when diluted with water and washed free from acid contains no halogen. Then pour the melt into water and filter off and wash the precipitate. The 2-anthraquinone aldehyde can be further purified by crystallizing it from alcohol. On treatment with oxidizing agents it is converted into anthraquinone carboxylic acid.

Example 2: Heat together one (1) part of the omega-dibrom derivative of 1-chlor-2-methyl-anthraquinone, ten (10) parts of ninety-seven (97) per cent. sulfuric acid, and one (1) part of anhydrous boric acid for from six (6) to seven (7) hours at a temperature of one hundred and thirty (130) degrees centigrade and isolate the 1-chlor-2-anthraquinone aldehyde in the manner described in the foregoing Example 1.

Example 3: Heat together one (1) part of the omega-dibrom derivative of 4-brom-1-hydroxy-2-methyl-anthraquinone, ten (10) parts of ninety-seven (97) per cent. sulfuric acid, and one (1) part of anhydrous boric acid for from five (5) to seven (7) hours at a temperature of one hundred and thirty (130) degrees centigrade. From the melt 4-brom-1-hydroxy-2-anthraquinone aldehyde can be isolated in the manner given in the foregoing Example 1. It is soluble in caustic-soda solution, with a violet-red color.

Now what I claim is—

1. The process for the production of aldehydes of the anthraquinone series by heating an omega-dihalogen derivative of a 2-methyl-anthraquinone with concentrated sulfuric acid.

2. The process for the production of aldehydes of the anthraquinone series by heating an omega-dihalogen derivative of a 2-methyl-anthraquinone with concentrated sulfuric acid and boric acid.

3. The process for the production of 2-anthraquinone aldehyde by heating omega-dichlor-2-methyl-anthraquinone with sulfuric acid.

4. As new articles of manufacture the aldehydes of the anthraquinone group which can be obtained by heating an omega-dihalogen derivative of a 2-methyl-anthraquinone with concentrated sulfuric acid, which aldehydes are soluble in concentrated sulfuric acid yielding from yellow to yellowish red solutions, and in anilin yielding reddish-yellow solutions and are also soluble in alcohol and in glacial acetic acid and upon oxidation can be converted into anthraquinone carboxylic acids.

5. As a new article of manufacture 2-anthraquinone-aldehyde which is a crystalline compound soluble in concentrated sulfuric acid yielding a yellow solution and in anilin yielding a reddish-yellow solution and which is soluble in alcohol and in glacial acetic acid and insoluble in caustic-soda solution and which upon oxidation can be converted into anthraquinone carboxylic acid.

In testimony whereof I have hereunto set my hand in the presence of two subscribing witnesses.

MAX HENRY ISLER.

Witnesses:
   J. ALEC. LLOYD,
   JOS. H. LEUTE.